US011167706B2

(12) United States Patent
Tiramani et al.

(10) Patent No.: US 11,167,706 B2
(45) Date of Patent: Nov. 9, 2021

(54) IMPACT ATTENUATION STRUCTURE (71) Applicant: Auto IP LLC, Las Vegas, NV (US)

(72) Inventors: Paolo Tiramani, Las Vegas, NV (US); Kyle Denman, North Las Vegas, NV (US)

(73) Assignee: Auto IP LLC, Las Vagas, NV (US)

( * ) Notice: Subject to any disclaimer, the term of this patent is extended or adjusted under 35 U.S.C. 154(b) by 150 days.

(21) Appl. No.: 16/589,308

(22) Filed: Oct. 1, 2019

(65) Prior Publication Data

US 2020/0108787 A1 Apr. 9, 2020

Related U.S. Application Data

(60) Provisional application No. 62/740,666, filed on Oct. 3, 2018.

(51) Int. Cl.
*B60R 19/18* (2006.01)
*B60R 19/04* (2006.01)

(52) U.S. Cl.
CPC .............. *B60R 19/18* (2013.01); *B60R 19/04* (2013.01); *B60R 2019/1806* (2013.01)

(58) Field of Classification Search
CPC .. B60R 19/18; B60R 19/04; B60R 2019/1806
See application file for complete search history.

(56) References Cited

U.S. PATENT DOCUMENTS

| 5,732,801 | A | 3/1998 | Gertz |
| 6,024,341 | A | 2/2000 | Gertz |
| 2002/0007994 | A1 | 1/2002 | Reid et al. |
| 2004/0174025 | A1 | 9/2004 | Converse et al. |

OTHER PUBLICATIONS

PCT International Search Report and Written Opinion, dated Dec. 4, 2019, in Internatonal Application No. PCT/US2019/053946.
U.S. Appl. No. 16/168,957, filed Oct. 24, 2018, Paolo Tiramani et al.
U.S. Appl. No. 16/168,978, filed Oct. 24, 2018, Paolo Tiramani et al.
U.S. Appl. No. 16/579,524, filed Sep. 23, 2019, Paolo Tiramani et al.
U.S. Appl. No. 16/579,571, filed Sep. 23, 2019, Paolo Tiramani et al.
U.S. Appl. No. 16/579,554, filed Sep. 23, 2019, Paolo Tiramani et al.

*Primary Examiner* — D Glenn Dayoan
*Assistant Examiner* — Melissa Ann Bonifazi
(74) *Attorney, Agent, or Firm* — McCarter & English, LLP (57) ABSTRACT

An impact structure for attenuating longitudinally-directed vehicle impacts, comprising first and second attenuation plates, where the plates are spaced apart from each other at a mounting region of the impact structure and fixed to each other at an impact region of the impact structure, and the impact region is longitudinally distal from the mounting region. There is an aperture pattern on each attenuation plate, wherein each aperture of the aperture pattern on each attenuation plate has an aspect ratio defined by the maximum size of the aperture in the longitudinal direction divided by the maximum size of the aperture in the direction perpendicular to the longitudinal direction; and the aspect ratio of the apertures of the aperture pattern on each attenuation plate generally increases or decreases in the longitudinal direction between the mounting region and the impact region.

16 Claims, 7 Drawing Sheets

IMPACT ATTENUATION STRUCTURE

CROSS-REFERENCE TO RELATED APPLICATION

This application claims the benefit of U.S. Provisional Application No. 62/740,666, filed Oct. 3, 2018.

BACKGROUND OF THE INVENTION

Field of the Invention

This invention relates to vehicle systems for absorbing impact energy.

Description of the Related Art

Structures, sometimes referred to as crash boxes, are utilized in the automotive field to lessen the severity of collisions. These structures are designed to collapse upon impact and thereby absorb impact energy, both to reduce vehicle speed more safely and to lower damage to vehicle components.

SUMMARY OF THE INVENTION

The present invention provides an impact structure intended to attenuate the severity of undesired forceful contact with other vehicles, fixed objects and the like.

In one aspect, the invention is directed to an impact structure for attenuating longitudinally-directed vehicle impacts comprising first and second attenuation plates, where the plates are spaced apart from each other at a mounting region of the impact structure and fixed to each other at an impact region of the impact structure, and where the impact region is longitudinally distal from the mounting region. There is an aperture pattern on each attenuation plate, where each aperture of the aperture pattern on each attenuation plate has an aspect ratio defined by the maximum size of the aperture in the longitudinal direction divided by the maximum size of the aperture in a direction approximately perpendicular to the longitudinal direction; and the aspect ratio of the apertures of the aperture pattern on each attenuation plate generally increases or decreases in the longitudinal direction between the mounting region and the impact region.

In another aspect, the invention is directed to an impact structure for attenuating longitudinally-directed vehicle impacts comprising first and second attenuation plates, where the plates are spaced apart from each other at a mounting region of the impact structure and fixed to each other at an impact region of the impact structure, and the impact region is longitudinally distal from the mounting region. There is an aperture pattern on each attenuation plate, where the apertures of the aperture pattern on each aperture plate have an increasing or decreasing aperture area in the longitudinal direction between the mounting region and the impact region, so that the amount of plate material changes in the longitudinal direction between the mounting region and the impact region.

These and other aspects of the present invention are described in the drawings annexed hereto, and in the description of the embodiments and claims set forth below.

DETAILED DESCRIPTION OF THE PREFERRED EMBODIMENTS

Figure 1A:
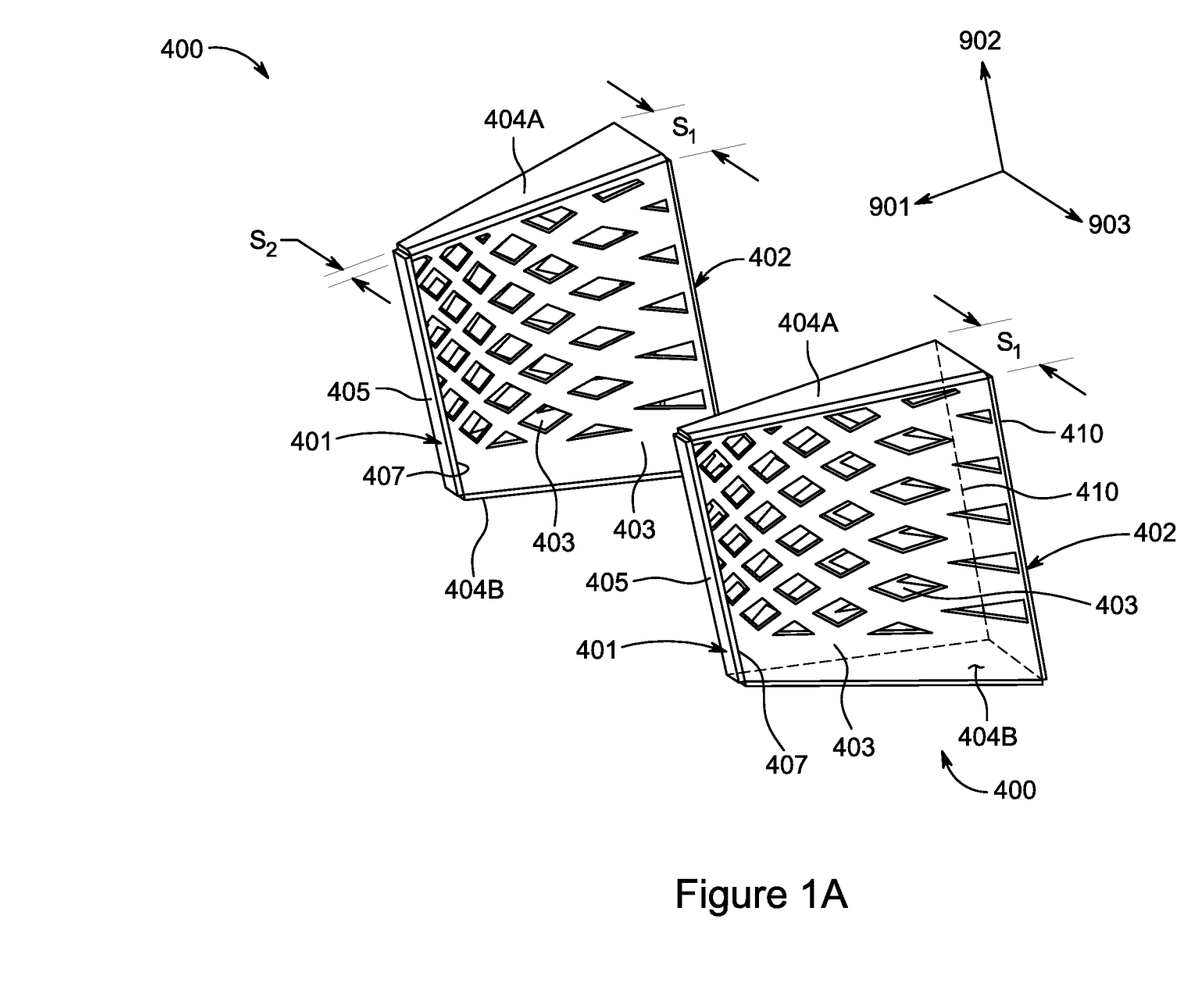
FIG. 1A is a perspective view of a pair of impact structures in accordance with one embodiment of the present invention.
Figure 1B:
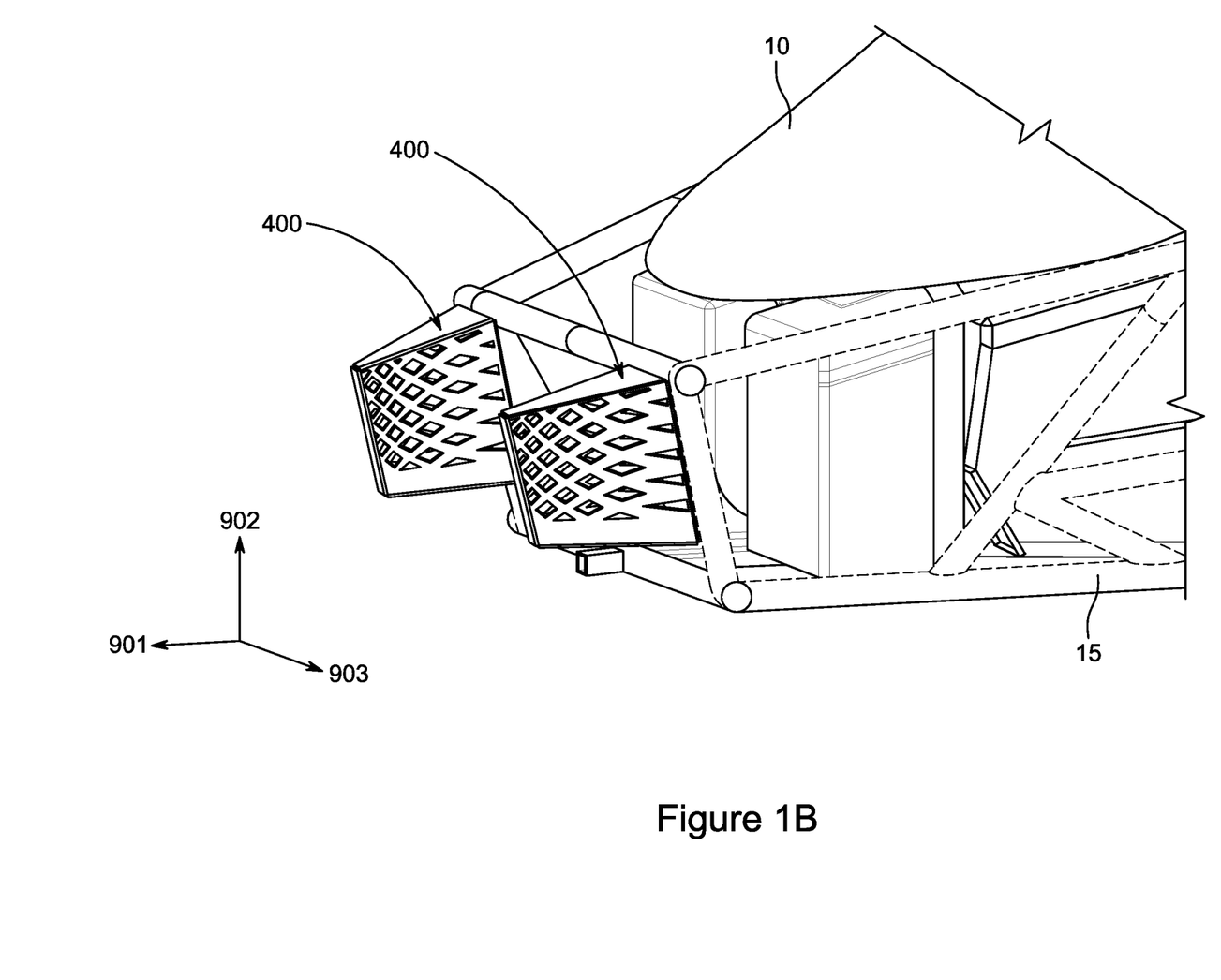
FIG. 1B depicts a perspective view of the pair of impact structures depicted in FIG. 1A positioned at appropriate locations on the front of a chassis of a vehicle.

FIG. 1A depicts one embodiment of the present invention, impact structure 400. For convenience of reference, the "longitudinal" direction is denoted by arrow 901, the "vertical" direction is denoted by arrow 902, and the "transverse" direction is denoted by arrow 903, which arrows are shown in FIG. 1A and elsewhere. For clarity, the vehicle on which impact structure 400 is mounted, vehicle 10 (a portion of which is seen in FIG. 1B) rolls (on a straight road) in the longitudinal direction; i.e., in the direction indicated by arrow 901.

Also for convenience of reference, reference in this disclosure to the "forward" portion of a structure or component, and like references, refers to the portions of the structure or component positioned toward the head of the arrow 901, and correspondingly, reference herein to the "rearward" portion of a structure or component, and like references, refers to the portions of the structure or component positioned away from the head of the arrow 901. Likewise for convenience of reference, reference in this disclosure to the "top" portion of a structure or component, and like references, refers to the portions of the structure or component positioned toward the head of the arrow 902, and correspondingly, reference herein to the "bottom" portion of a structure or component, and like references, refers to the portions of the structure or component positioned away from the head of the arrow 902.

Still further for convenience of reference, the "length" of impact structure 400 generally refers to its dimension in the direction of arrow 901, the "width" of impact structure 400 generally refers to its dimension in the direction of arrow 902, and the "thickness" of impact structure 400 generally refers to its dimension in the direction of arrow 903. Among the different embodiments disclosed herein, like numerical designators refer to the same components.

Impact structure 400 is adapted for mounting to the forward or rear portion of a chassis 15 of vehicle 10. The front of vehicle 10 is shown for example in FIG. 1B. Generally two or more of structures 400 are to be arranged across the front of a chassis 15; thus the two structures 400 shown in FIG. 1A are depicted in FIG. 1B affixed to the front of the chassis 15 of a vehicle 10. Chassis 15 is characterized by a number of tubular members fastened to each other and arranged to form a three dimensional exoskeleton structure, sometimes referred to as a space frame. Although described with respect to the particular structure of chassis 15 for illustrative purposes, impact structure 400 and the inventions described herein can be utilized with a variety of different chassis designs.

In FIG. 1A, each impact structure 400 has two regions, impact region 401 and mounting region 402, and two principal operative components, namely two attenuation plates 403, which are positioned between and join impact region 401 and mounting region 402. In the embodiment shown, the attenuation plates 403 of each impact structure 400 are inclined toward each other in the longitudinal direction from mounting region 402 to impact region 401, and the rear edges 410 of the attenuation plates 403 of each impact structure 400 are generally parallel.

Figure 3A:
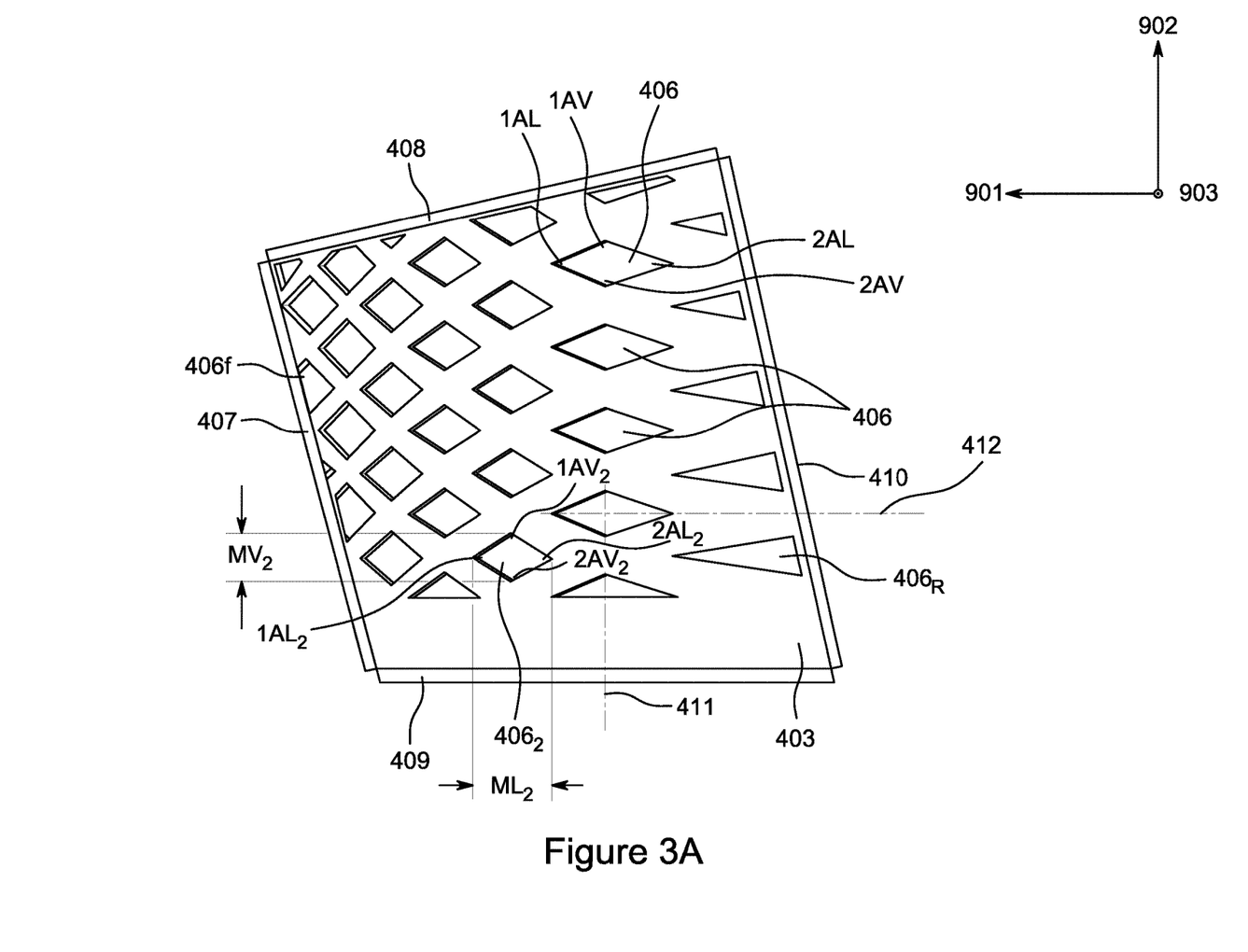
FIG. 3A is a plan view of an attenuation plate in accordance with one embodiment of the present invention.

FIG. 3A depicts an attenuation plate 403 in plan view. Attenuation plate 403 is a quadrilateral defined by forward edge 407, rear edge 410 (opposing forward edge 407), top edge 408 and bottom edge 409 (opposing top edge 408). Forward edge 407 and rear edge 410 are vertically oriented, and top edge 408 and bottom edge 409 are longitudinally oriented. In this disclosure, a direction is considered to be in the "vertical direction," and a component is considered to be "vertically oriented," if the direction or component is oriented within 45 degrees of the direction of arrow 902, and includes directions and orientations exactly oriented in the direction of arrow 902 as well as approximately oriented in the direction of arrow 902. Likewise in this disclosure, a direction is considered to be in the "longitudinal direction," and a component is considered to be "longitudinally oriented," if the direction or component is oriented within 45 degrees of arrow 901, and includes directions and orientations exactly oriented in the direction of arrow 901 as well as approximately oriented in the direction of arrow 901.

In general, the shape and dimensions of attenuation plate 403 in plan can be varied to accommodate the dimensions of the vehicle structure to which impact structure 400 is to be mounted, and/or to give impact structure 400 a more pleasing aesthetic, limited only by the desire not to significantly reduce the amount of surface area of attenuation plate 403 from that which energy absorption considerations may dictate, or the efficacy of that plate 403 to absorb impact energy, in the manner described below. For example, as shown in FIG. 3A the length of forward edge 407 is less than the length of longitudinally distal opposing rear edge 410, whereas top and bottom edges 408, 409 have approximately the same length. Further, the top edge 408 is shown in FIG. 3A as canted forward relative to bottom edge 409.

As shown in FIG. 1A, the rear edges 410 of attenuation plates 403 proximate mounting region 402 are spaced apart a distance $S_1$, and the edges of attenuation plates 403 proximate impact region 401 are spaced apart a distance $S_2$. In one embodiment, $S_2$ is less than $S_1$, so that impact structure 400, when viewed from above, tapers in thickness from mounting region 402 to impact region 401.

Attenuation plates 403 are joined by longitudinally oriented joiner plates 404. In particular, the top opposed edges of attenuation plates 403 are joined by top joiner plate 404A, shown in FIG. 1A, and the bottom opposed edges of attenuation plates 403 are joined by bottom joiner plate 404B. The goal of joiner plates 404 is to inhibit Euler-like buckling of plates 403 upon impact of impact structure 400, so that the collapse of plates 403 is maximally energy-absorptive. One or more intermediate joiner plates 404C (not shown) may be positioned between top joiner plate 404A and bottom joiner plate 404B as desired to inhibit other higher order buckling modes.

The forward edges 407 of attenuation plates 403 are each fixed to the other. Thus in the embodiment shown in FIG. 1A, the forward edges 407 of attenuation plates 403 proximate impact region 401 are joined by a nose strip 405, which is an elongate vertically oriented plate that separates those forward opposed edges by distance $S_2$. The presence of nose strip 405 provides a narrow surface that facilitates mounting a bumper or other fascia. Thus in the embodiment of FIG. 1A, impact structure 400 when viewed from above appears as an isosceles trapezoid. In an alternative embodiment, the forward edges 407 of attenuation plates 403 proximate impact region 401 are joined to each other, such that distance $S_2$ is approximately zero. In this embodiment, impact structure 400 when viewed from above appears as an isosceles triangle.

Impact structure 400 is designed to offer progressively increasing resistance to impact, and provide progressively increasing energy absorption, as an impact proceeds. That is, upon impact region 401 of impact structure 400 coming into contact with for example an object which significantly resists the forward motion of vehicle 10, attenuation plates 403 at their forward edges 407 or rear edges 410 will begin to crumple (depending upon design), which absorbs the kinetic energy of vehicle 10 and causes the rate of closure between the object and vehicle 10 to decrease. Additionally, the goal of the present invention is for crumpling not to occur longitudinally across attenuation plates 403 at the same time, but to start at the forward edges 407 or the rear edges 410 (depending on design) of attenuation plates 403, with the crumple front (the boundary between uncrumpled and crumpled portions of plates 403) moving in a longitudinal direction between impact region 401 and mounting region 402. As it does so, impact structure 400 offers progressively increasing amount of resistance to impact, and absorbs progressively increasing amounts of energy. For example, if X is denominated the amount of energy absorbed in the collapse of the first 33% of plates 403, then the amount of energy absorbed in the collapse of the next 33% will not be X also, but Y, where Y is greater than X, with the value of Y dependent upon the specific design of attenuation plates 403.

In one embodiment, impact structure 400 provides progressively increasing resistance, and progressively increasing energy absorption, by featuring a plurality of selectively shaped and/or positioned apertures 406 in each of attenuation plates 403, which in general results in there being changing amounts of plate material in plates 403 in the longitudinal direction between forward edges 407 of plates 403 and rear edges 410 of plates 403. In the embodiment of attenuation plates 403 shown in FIGS. 3A and 3B, there is an increasing amount of plate material in plates 403 in the longitudinal direction from forward edge 407 to rear edge 410. This characteristic is realized in the embodiment of FIGS. 3A and 3B by providing a series of kite-shaped apertures 406 having a geometry as described herein.

Figure 3B:
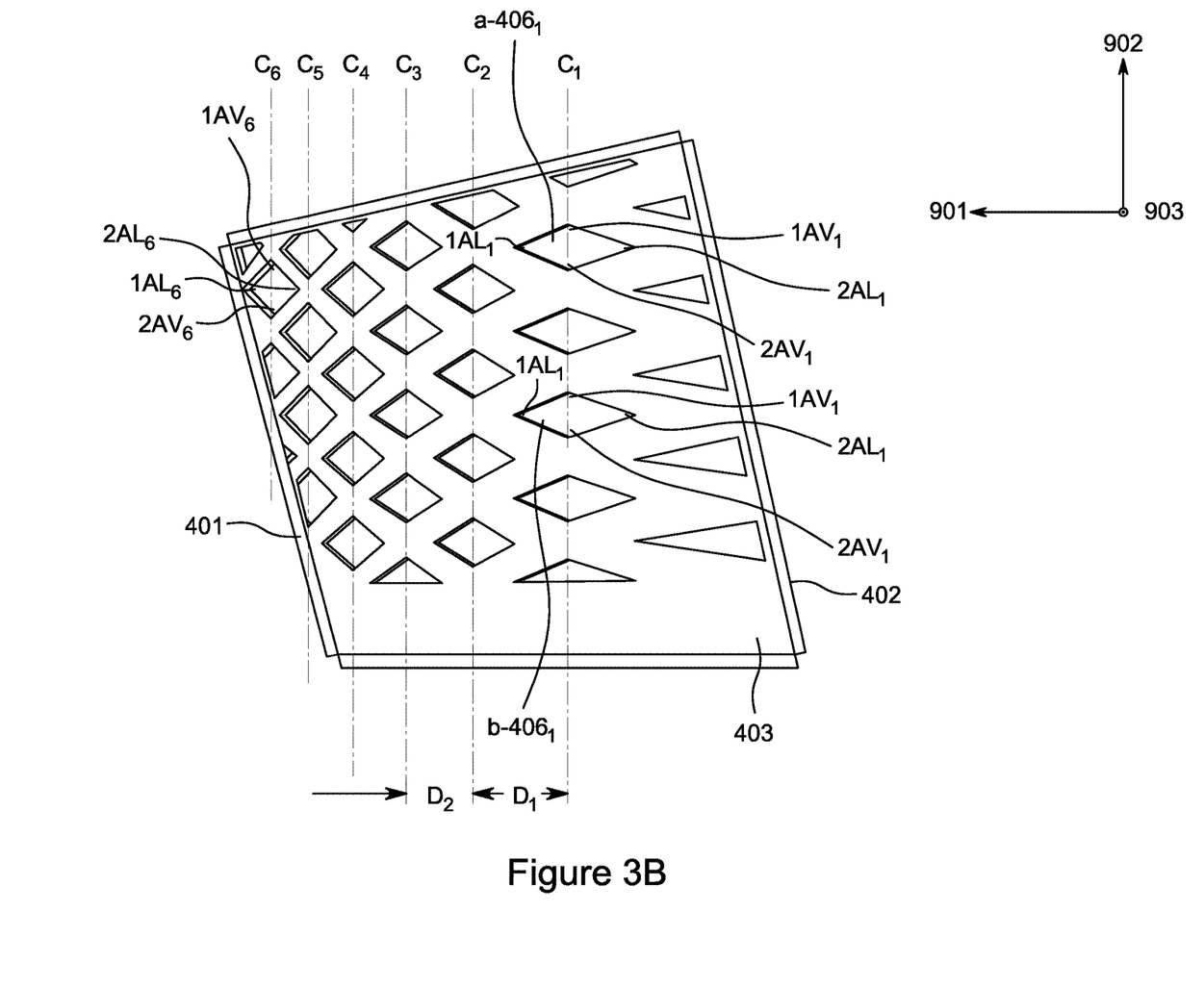
FIG. 3B is the same plan view illustrating certain geometrical relationships relating to the apertures in the attenuation plate.

In particular, referring to FIG. 3A each kite-shaped aperture 406 is defined by two interior vertical angles 1AV and 2AV (a geometric line 411 joining the two interior vertical angles 1AV and 2AV of each aperture 406 is vertically oriented) and two interior longitudinal angles 1AL and 2AL (a geometric line 412 joining the two interior angles 1AL and 2AL of each aperture 406 is longitudinally oriented). Further, as shown in FIG. 3B the apertures 406 are arranged in successive vertically oriented columns $C_i$, i in number. In FIG. 3B, there is depicted for illustration six columns, $C_1$, $C_2$, $C_3$, $C_4$, $C_5$ and $C_6$, longitudinally arrayed across the face of an attenuation plate 403. The angles $1AV_i$, $2AV_i$ of the apertures $406_i$ of the $C_i$th column preferably are vertically oriented, one over the other. Thus for example, angles $1AV_1$ and $2AV_1$ of aperture a-$406_1$ of Column $C_1$ in FIG. 3B are vertically oriented, one over the other, angles $1AV_1$ and $2AV_1$ of aperture b-$406_1$ of Column $C_1$ in FIG. 3B are vertically oriented, one over the other, and the angles $1AV_1$ and $2AV_1$ of aperture a-$406_1$ are vertically oriented over the angles $1AV_1$ and $2AV_1$ of aperture b-$406_1$.

In the nomenclature of FIG. 3B, column $C_2$ is longitudinally closer to impact region 401 than column $C_1$, and in general in FIG. 3B column $C_{i+1}$ is longitudinally closer to impact region 401 than column $C_i$. Where a portion of an aperture 406 would overlap with the forward edge 406 or a rear edge 410 of an attenuation plate 403, an appropriate portion of a complete aperture can be provided, such as aperture $406_F$ and aperture $406_R$ shown in the FIG. 3A.

Additionally, for a given column $C_i$ as depicted in FIG. 3B the angles $1AV_i$ of each aperture 406 in column $C_i$ preferably are approximately the same as each other, and the angles $2AV_i$ of each aperture 406 in column $C_i$ preferably are approximately the same as each other. Likewise for a given column $C_i$ the angles $1AL_i$ of each aperture 406 in column $C_i$ preferably are approximately the same as each other, and the angles $2AL_i$ of each aperture 406 in column $C_i$ preferably are approximately the same as each other. The angles $1AV_i$ and $2AV_i$ of an aperture 406 in a column $C_i$ can be the same, or can differ, depending on design preference. The angles $1AL_i$ and $2AL_i$ of an aperture 406 in a column $C_i$ also can be the same, or can differ, depending on design preference.

On the other hand, between adjacent columns $C_i$ and $C_{i+1}$, $1AV_i$ preferably is not the same as $1AV_{i+1}$, $2AV_i$ preferably is not the same as $2AV_{i+1}$, $1AL_i$ preferably is not the same as $1AL_{1+1}$, and $2AL_i$ preferably is not the same as $2AL_{i+1}$. In the embodiment depicted in FIGS. 3A and 3B, the longitudinal angles 1AL, 2AL are greater for apertures 406 positioned longitudinally closer to impact region 401 than mounting region 402, and the vertical angles 1AV, 2AV are less for apertures 406 positioned longitudinally closer to impact region 401 than mounting region 402. Thus for example, the angles $1AV_1$ and $2AV_1$ of column $C_1$ are obtuse, where the angles $1AL_1$ and $2AL_1$ of column $C_1$ are generally acute. However, this relationship is markedly different in column $C_6$, where the angles $1AV_6$ and $2AV_6$ of column $C_6$ are acute (or nearly so), and the angles $1AL_6$ and $2AL_6$ are obtuse (or nearly so). Further, the foregoing relationships permit the longitudinal distance between adjacent columns closer to impact region 401 (i.e., the longitudinal distance between columns $C_1$ and $C_2$) to decrease as compared to the longitudinal distance between adjacent columns further from impact region 401. Thus for example in FIG. 3B, the longitudinal distance $D_2$ between columns $C_2$ and $C_3$ is less than the longitudinal distance $D_1$ between columns $C_1$ and $C_2$.

Correspondingly, in the embodiment depicted in FIGS. 3A and 3B the aspect ratio of apertures 406 is lower for apertures 406 positioned longitudinally closer to impact region 401 than mounting region 402; in this disclosure, and in the case of apertures aligned as in the figures, the "aspect ratio" is the maximum distance ML across an aperture in the longitudinal direction divided by the maximum distance MV across the aperture in the vertical direction. Thus for the kite-shaped aperture $406_2$ shown in FIG. 3A, the aspect ratio is the longitudinal distance $ML_2$ between angles $1AL_2$ and $2AL_2$ divided by the vertical distance $MV_2$ between angles $1AV_2$ and $2AV_2$.

Patterning apertures 406 in accordance with the foregoing relationships results in the sides of apertures 406 longitudinally closer to impact region 401 being more vertical than the sides of apertures 406 longitudinally more distal from impact region 401. The result is to produce a structure that progressively offers more resistance and progressively requires more energy to crumple, the more the distance (in the longitudinal direction) increases from impact region 401 and toward mounting region 402.

As an alternative to kite-shaped apertures 406, an array of elliptical apertures can be provided in attenuation plates 403, where the aspect ratio of the elliptical apertures positioned longitudinally closer to impact region 401 is lower than those positioned longitudinally closer to mounting region 402. As yet another alternative, circular apertures can be provided in attenuation plates 403, where the diameters of the circular apertures positioned longitudinally closer to impact region 401 are greater or less (depending on design) than those of the circular apertures positioned longitudinally further from impact region 401. In general, any aperture pattern for attenuation plates 403, or other means that yields a successive change in plate material in the longitudinal direction between mounting region 402 and contact region 403, is in accord with the inventors' objectives. The rate of change in plate material in the forward longitudinal direction can be linear, stepped, or increasing in accordance with a selected function, as desired.

Further, although the embodiment of FIGS. 3A and 3B offers progressively more resistance to crumpling, and requires progressively more energy to crumple plates 403, as the distance increases (in the longitudinal direction) from impact region 401 toward mounting region 402, the patterning producing this result can be reversed; for example, the sides of apertures 406 longitudinally closer to impact region 401 can be less vertical than the sides of apertures 406 longitudinally more distal from impact region 401. In the latter instance, attenuation plates 403 offer progressively more resistance to crumpling, and progressively more energy is required to crumple plates 403, as the distance increases (in the longitudinal direction) from mounting region 402 toward impact region 401.

Attenuation plates 403 can be fabricated from any plate material that tends to deform and crumple (as opposed to shattering) upon being subject to loads above the elastic yield point, for example, aluminum plate. Impact structure 400 can be secured to chassis 15 by suitable means such as by welding or utilizing bolts, including the means described in connection with impact structure 500 below.

Figure 2A:
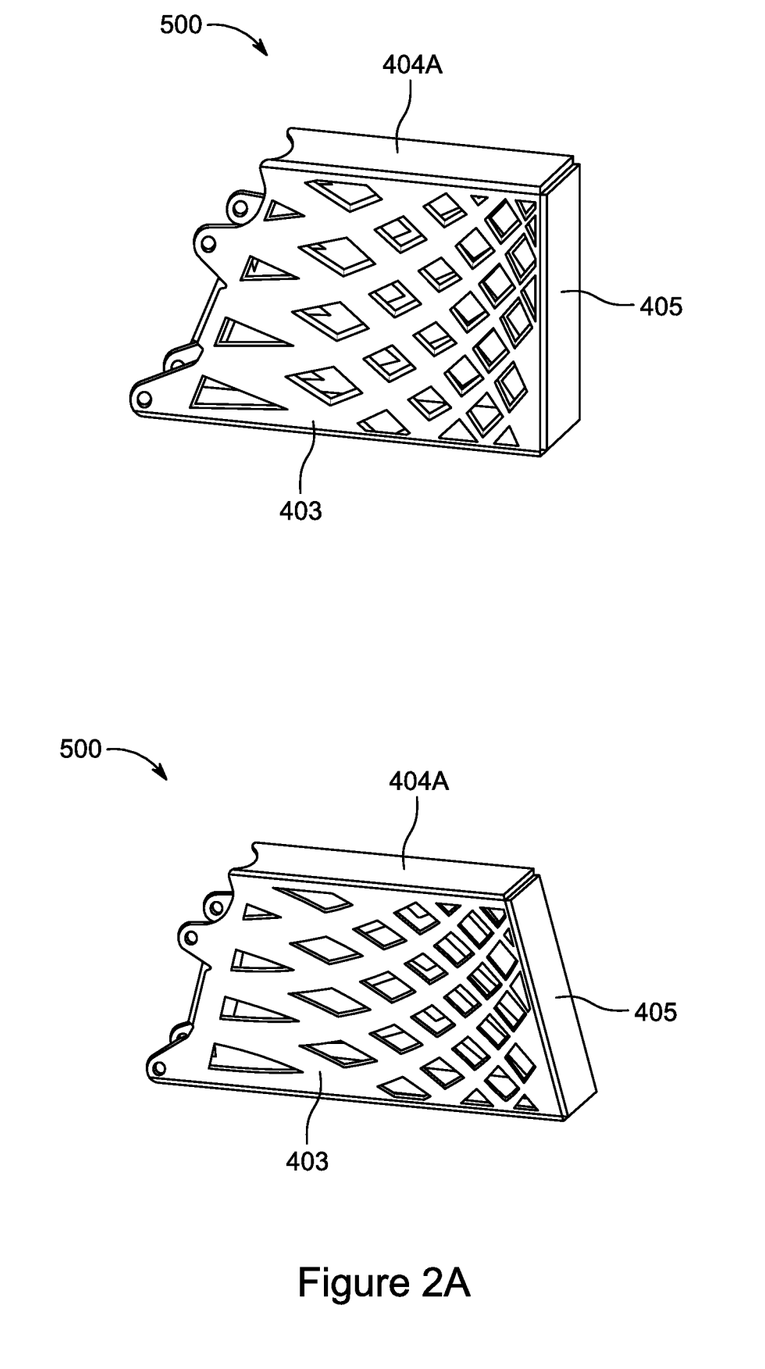
FIG. 2A is a perspective view of a pair of impact structures in accordance with a second embodiment of the present invention.
Figure 2B:
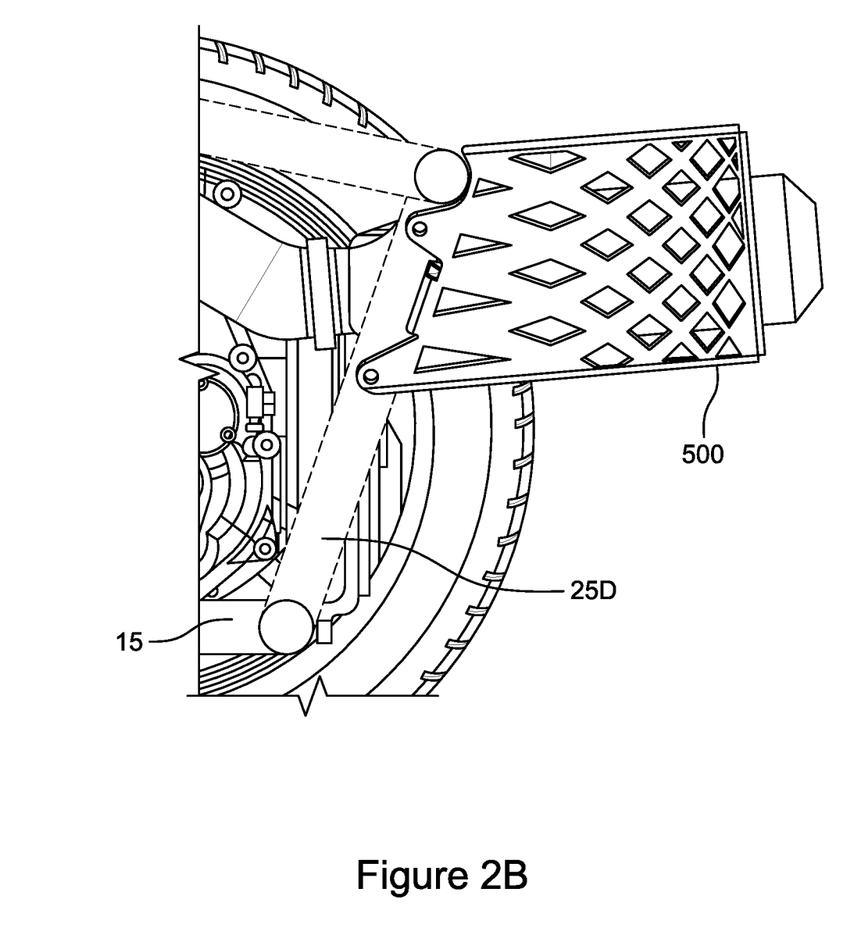
FIG. 2B depicts a perspective view of one of the pair of impact structures depicted in FIG. 2A positioned at an appropriate location on the rear of a chassis of a vehicle.
Figure 4:
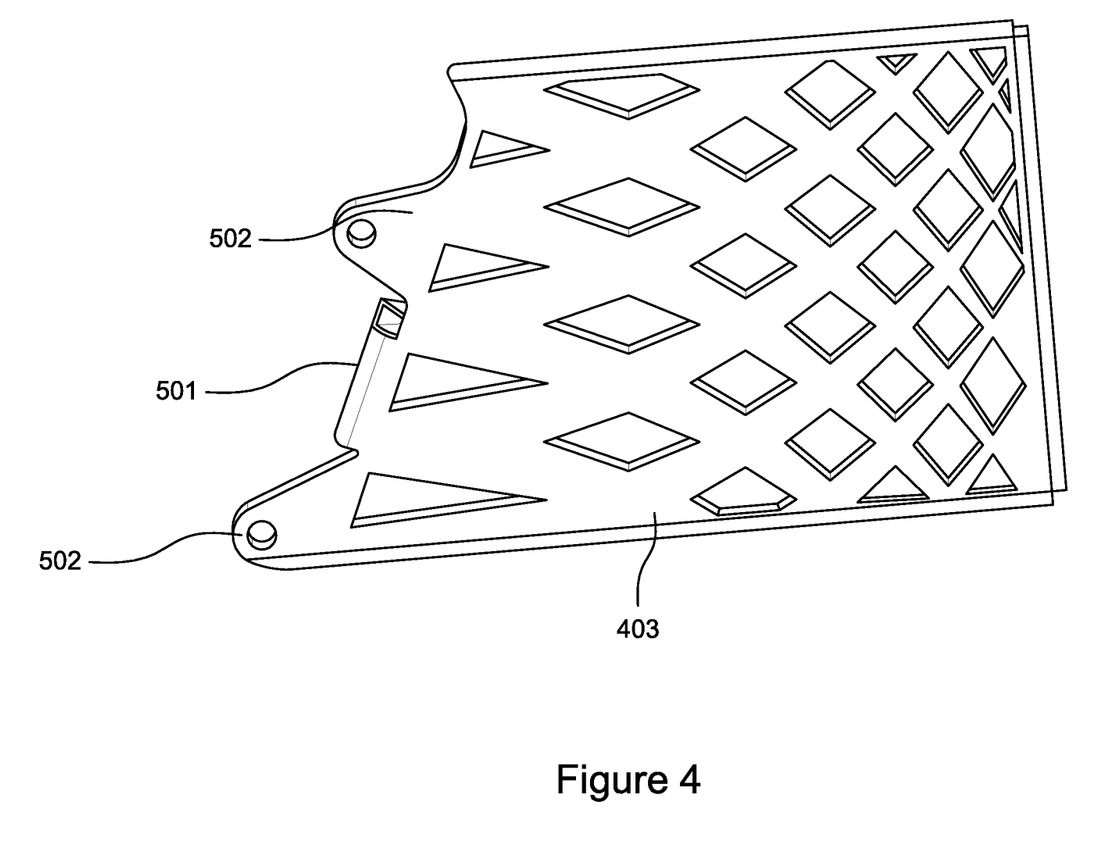
FIG. 4 is a plan view of an attenuation plate in accordance with the second embodiment of the present invention.

FIG. 2A shows another embodiment of the present invention, specifically two impact structures 500. FIG. 2B depicts an impact structure 500 affixed to the rear of the chassis 15 of a vehicle 10, although generally two or more of structures 500 are to be arranged across the rear of a chassis 15. As compared to impact structure 400, the shape in plan of the attenuation plates 403 are different in impact structure 500; the attenuation plates 403 are generally parallel in structure 500, and structure 500 is provided with a mounting cradle 501 and mounting tabs 502, shown for example in FIG. 4, which facilitate positioning and securing impact structure 500 to upright tubular member 25D of chassis 15, shown in FIG. 2B.

In particular, tubular member 25D shown in FIG. 2B can be drilled to receive bolts, and after positioning impact structure 500 against tubular members 25D, bolts can be inserted to secure structure 25D in place. Alternatively, structures 400 and 500 can be secured to the tubular members of chassis 15 using the boss designs and fastener systems disclosed in U.S. Nonprovisional patent application Ser. No. 16/168,957 entitled "Invertible Reversible Multi-Application Gearbox," filed Oct. 24, 2018 and having the same inventors as the subject application; the disclosures relating to boss design and fastener systems in U.S. Nonprovisional patent application Ser. No. 16/168,957 are hereby incorporated by reference as if fully set forth herein, particularly including the disclosures relating to boss design and the structures secured to an exoskeleton/space frame chassis using bosses and associated supporting elements, found for example at paragraph 51 and FIG. 2A thereof. Structures 400 and 500 can also be secured to the tubular members of chassis 15 using the boss designs and fastener systems disclosed in U.S. Nonprovisional patent application Ser. No. 16/168,978 entitled "Gearbox Mounting System," filed Oct. 24, 2018 and having the same inventors as the subject application; the disclosures relating to boss design and fastener systems in U.S. Nonprovisional patent application Ser. No. 16/168,978 are hereby incorporated by reference as if fully set forth herein, particularly including the disclosures relating to boss design and the structures secured to an exoskeleton/space frame chassis using bosses and associated supporting elements, found for example at paragraphs 49-56 and 57 ($1^{st}$ and $2^{nd}$ sentences) and in FIGS. 4 and 5A-5D thereof. Still further, structures 400 and 500 can be secured to the tubular members of chassis 15 using the boss designs and fastener systems disclosed in U.S. Provisional Application No. 62/735,966 entitled "Chassis Anchoring Systems" filed Sep. 25, 2018; the contents of that provisional application pertaining to boss design and fastener systems are hereby incorporated by reference as if fully set forth herein. Likewise, structures 400 and 500 can also be secured to the tubular members of chassis 15 using the boss designs and fastener systems disclosed in U.S. Nonprovisional patent application Ser. No. 16/579,554 entitled "Chassis Anchoring Systems", filed Sep. 23, 2019 and having the same inventors as the subject application; the contents of U.S. Nonprovisional patent application Ser. No. 16/579,554 pertaining to boss design and fastener systems are hereby incorporated by reference as if fully set forth herein, found for example at paragraphs 60-67 and in FIGS. 5A, 5B and 6. The mounting cradle 501 and mounting tabs 502 utilized for impact structure 500 can also be employed to facilitate the positioning and mounting of impact structure 400 to an appropriate portion of the front of chassis 15.

The foregoing detailed description is for illustration only and is not to be deemed as limiting the inventions, which are defined in the appended claims.

What is claimed is:

1. An impact structure for attenuating longitudinally-directed vehicle impacts, comprising:
   first and second attenuation plates, the plates spaced apart from each other at a mounting region of the impact structure and fixed to each other at an impact region of the impact structure, the impact region being longitudinally distal from the mounting region;
   an aperture pattern on each attenuation plate, each aperture of the aperture pattern on each attenuation plate having an aspect ratio defined by the maximum size of the aperture in the longitudinal direction divided by the maximum size of the aperture in a direction approximately perpendicular to the longitudinal direction, wherein the aperture pattern on each attenuation plate comprises (a) a first plurality of apertures approximately arranged in a first column oriented in the direction approximately perpendicular to the longitudinal direction, with at least two of the apertures of the first plurality of apertures each having a first aspect ratio, and (b) a second plurality of apertures approximately arranged in a second column oriented in the direction approximately perpendicular to the longitudinal direction, with at least two of the apertures of the second plurality of apertures each having a second aspect ratio that is more than or less than the first aspect ratio; and
   the aspect ratio of the apertures of the aperture pattern on each attenuation plate generally increasing or decreasing in the longitudinal direction between the mounting region and the impact region, with the first column being closer in the longitudinal direction to the impact region than the second column.

2. The impact structure as in claim 1, further comprising (c) a third plurality of apertures approximately arranged in a third column oriented in the direction approximately perpendicular to the longitudinal direction; with the second column being closer to the impact region than the third column; and (i) the longitudinal distance between the first column and the second column being less than the longitudinal distance between the second column and the third column if the first aspect ratio is less than the second aspect ratio, or (ii) the longitudinal distance between the first column and the second column being greater than the longitudinal distance between the second column and the third column if the first aspect ratio is greater than the second aspect ratio.

3. The impact structure as in claim 2, wherein at least some of the apertures of the first, second and third columns are kite-shaped.

4. The impact structure as in claim 2, wherein at least some of the apertures of the first, second and third columns are elliptically-shaped.

5. The impact structure as in claim 1, further comprising a joinder plate oriented approximately perpendicular to the first attenuation plate and the second attenuation plate and joined to the first attenuation plate and the second attenuation plate.

6. The impact structure as in claim 1, further comprising an elongate plate joined to the first and second impact attenuation plates at the impact region to fix each to the other.

7. The impact structure as in claim 1, wherein the first and second impact attenuation plates at joined to each other at the impact region to fix each to the other.

8. The impact structure as in claim 1, wherein at least some of the apertures of the first column are kite-shaped.

9. The impact structure as in claim 8, wherein at least some of the apertures of the second column are kite-shaped.

10. The impact structure as in claim 1, wherein at least some of the apertures of the first column are elliptically-shaped.

11. The impact structure as in claim 10, wherein at least some of the apertures of the second column are elliptically-shaped.

12. The impact structure as in claim 1, wherein the first and second attenuation plates each has a quadrilateral shape with a forward edge proximate the impact region, a rear edge proximate the mounting region, a top edge and a bottom edge.

13. The impact structure as in claim 12, wherein the length of the forward edge of each of the first and second attenuation plates is less than the length of the rear edge of the respective attenuation plate.

14. The impact structure as in claim 1, wherein the aspect ratio of the first plurality of apertures in the first column of each attenuation plate is lower than the aspect ratio of the second plurality of apertures in the second column of the respective attenuation plate, and the aspect ratio of the apertures of the aperture pattern on each attenuation plate generally decreases in the longitudinal direction from the mounting region to the impact region.

15. The impact structure as in claim 1, wherein the first and second attenuation plates are generally parallel to each other.

16. The impact structure as in claim 1, wherein the first and second attenuation plates are inclined toward each other in the longitudinal direction from the mounting region to the impact region.

* * * * *